(No Model.)
H. J. KREBS.
MANUFACTURE OF GLUCOSE.
No. 288,245. Patented Nov. 13, 1883.
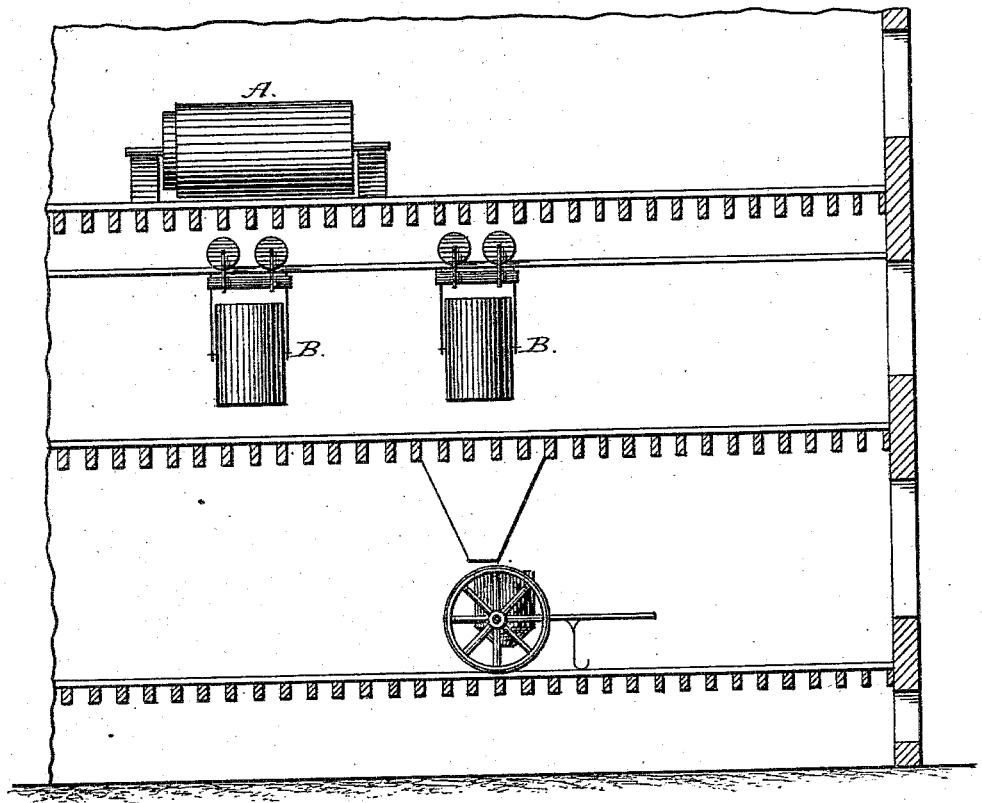
Attest:
F. T. Chapman
C. Fred. Heller
Inventor:
H. Johannes Krebs
By F. W. Howard
Associate Atty.

United States Patent Office.

H. JOHANNES KREBS, OF WILMINGTON, DELAWARE, ASSIGNOR OF ONE-HALF TO ALFRED D. WARNER, OF SAME PLACE.

MANUFACTURE OF GLUCOSE.

SPECIFICATION forming part of Letters Patent No. 288,245, dated November 13, 1883.

Application filed September 15, 1883. (No model.)

*To all whom it may concern:*

Be it known that I, H. JOHANNES KREBS, a subject of the King of Denmark, residing at Wilmington, county of New Castle, State of Delaware, have invented certain new and useful Improvements in the Manufacture of Glucose; and I do hereby declare that the following is a full, clear, and exact description of the invention, which will enable others skilled in the art to which it appertains to make and use the same.

My invention relates to improved means for handling and moving the grain while it is subject to treatment by the acidulated water. This object I attain by subjecting the grain to the action of the acid in movable vessels, as will be more fully shown, reference being had to the accompanying drawing.

In the production of glucose from permeable grain, it is customary to mix the prepared grain with acid water in a revolving vessel called a "rumbler," (represented in the drawing by A.) When this has been satisfactorily effected, the contents of the rumblers are discharged into large stationary bins or on a floor, where the grain is stored until it is thoroughly saturated with the acid water. To effect this requires about twenty-four hours.

A factory working on an extensive scale requires a large floor to hold the acidulated corn, which floor must be covered with lead to prevent the acid from dropping through, and a good deal of shoveling is necessary to keep the corn of different rumblings from getting mixed together. This plan involves considerable outlay in covering the floor, and costly labor in handling the grain. The bin system also presents grave objections. First, the corn, after being bruised and acidulated, becomes "dead," which renders its discharge very difficult; secondly, the different rumblings which go to fill the bin or bins cannot be kept separate, so that the matured and not matured corn or grain is discharged together, thus injuring the quality of the article manufactured. These difficulties have led me to adopt a system of movable vessels which effectually overcomes these objections and enables the operator to use always the corn just in its right condition.

The drawing shows one form of my apparatus, which I will describe by way of illustration.

B B are two tub-shaped vessels, suspended from a track underneath the floor, containing the rumblers. A number of these are employed, enough to hold acidulated material for some twenty-four hours' run of the factory. These are so constructed as to discharge by tipping, which is preferable to emptying through openings, partly because the material is dead and does not discharge freely, and partly because tight wooden vessels are preferable, as being unaffected by the acid water. These vessels can be arranged in different ways. They may have the character of railway-cars or ordinary wagons or trucks, or may be vessels fitted for moving by the aid of blocks, tackles, or cranes. They may also take the shape of rumblers so arranged that the vessel can be disconnected from the gearing and rolled away and kept at rest till the corn is ready for use. For simplicity and convenience, however, I prefer something like the form illustrated in the drawing.

It will be seen that this system is cheap, economical in labor, and entirely efficient, and the resulting product is cheaper and the quality better than that produced by the old method.

Having thus described my invention, what I claim as new, and desire to secure by Letters Patent, is—

The herein-described means for treating grain during the process of manufacturing glucose by exposing it to the acidulated water in movable vessels, substantially as described.

Signed at Wilmington, Delaware, this 3d day of September, 1883.

H. JOHS. KREBS.

Witnesses:
JOHN C. COLE,
PETER SPRINGER.